United States Patent [19]

Nam et al.

[11] Patent Number: 4,754,140
[45] Date of Patent: Jun. 28, 1988

[54] DIAMOND AS A THERMOLUMINESCENT MATERIAL

[76] Inventors: Tom L. Nam, 114 Sixth Ave., Bez Valley; Transvaal; Rex J. Keddy, Bevan Rd., Rivonia, Sandton, Transvaal; Robert C. Burns, 15 Los Angeles Dr., Northcliff, Transvaal, all of South Africa

[21] Appl. No.: 841,171

[22] Filed: Mar. 19, 1986

[30] Foreign Application Priority Data

Mar. 21, 1985 [ZA] South Africa ................. 85/2121

[51] Int. Cl.$^4$ ................................................ G01T 1/11
[52] U.S. Cl. .................................. 250/337; 250/483.1
[58] Field of Search ................ 250/337, 483.1, 370 F; 252/301.4 R

[56] References Cited

U.S. PATENT DOCUMENTS

| | | | |
|---|---|---|---|
| 3,417,240 | 12/1968 | Lamb et al. | 250/337 |
| 3,772,206 | 11/1973 | Hitomi et al. | 250/337 |
| 4,204,119 | 5/1980 | Yasuno et al. | 250/337 |
| 4,465,932 | 8/1984 | Burgemeister | 250/370 F |

FOREIGN PATENT DOCUMENTS 716286 of 0000 U.S.S.R. .

*Primary Examiner*—Janice A. Howell
*Attorney, Agent, or Firm*—Scully, Scott, Murphy & Presser

[57] ABSTRACT

Diamond having a nitrogen content not exceeding 100 ppm and electrons or holes trapped at lattice imperfections within the crystal structure has been found to be a good thermoluminescent material. The diamond is produced by taking a diamond having a nitrogen content not exceeding 100 ppm and subjecting it to nuclear radiation.

10 Claims, 2 Drawing Sheets

DIAMOND AS A THERMOLUMINESCENT MATERIAL

BACKGROUND OF THE INVENTION

This invention relates to diamond as a thermoluminescent material.

When a thermoluminescent phosphor is exposed to nuclear radiation while at a sufficiently low temperature, many of the free electrons or holes become trapped at lattice imperfections. They may remain trapped for long periods of time when stored at that or a lower temperature. As the temperature is raised the probability of escape is increased and the electrons (or holes) are released from the traps, subsequently returning to stable energy states, often with the emission of light. Materials which exhibit this characteristic are known as thermoluminescent dosimetry (TLD) materials, and in an example of one such material is lithium fluoride.

Type I industrial diamonds have also been shown to exhibit a certain degree of thermoluminescence - "Possible Use of Industrial Diamonds in Radiation Dosimetry" by A. C. Carter, Industrial Diamond Review, July 1977, pp 239–241. However, the commercially available diamonds, either of synthetic or natural origin, have not been shown to have sufficient sensitivity in this regard to warrant further investigation.

European Patent Publication No. 0052397 describes a method and apparatus for the detection of ionising radiation in which a diamond is used as the radiosensitive element of the detecting apparatus, which diamond has low ($2\times 10^{-3}$ at % or less) nitrogen and low ($10^{-3}$ or less) birefringence and in which diamond the lifetime of the free carrier generated by the ionising radiation is $10^{-6}$s or longer. The current/voltage characteristic of the diamond under irradiation is linear at low bias voltage and the dose rate can be determined for the resistivity of the diamond. It is stated that a synthetic diamond crystal can be used to advantage as the radiosensitive element. There is no disclosure or suggestion in this specification that the diamond has thermoluminescent properties.

SUMMARY OF THE INVENTION

It has now been found, and this forms the basis of the present invention, that diamond having a nitrogen content not exceeding 100 ppm and electrons or holes trapped at lattice imperfections within the crystal structure of the diamond are capable of thermoluminescing.

The invention thus provides a material capable of thermoluminescence which comprises such a diamond. The invention provides according to another aspect a method of causing a material as described above to luminesce including the step of subjecting that material to a temperature above ambient and below 500° C.

Still further according to the invention, there is provided a device capable of measuring a dose of nuclear radiation comprising a diamond particle having a nitrogen content not exceeding 100 ppm.

DETAILED DESCRIPTION OF THE INVENTION

Figure 1:
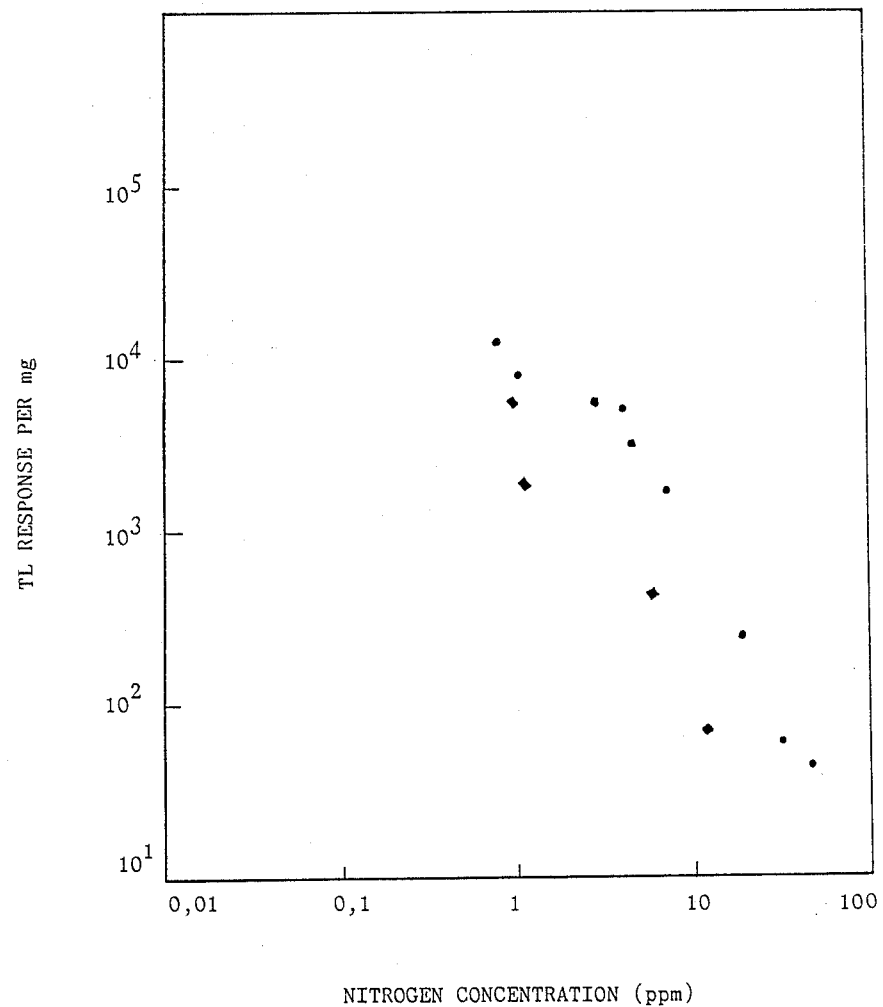
FIG. 1 illustrates the thermoluminescent (TL) response in relation to nitrogen content of various diamonds.

It has surprisingly been found that diamond having a nitrogen content of less tha 100 ppm and electrons or holes trapped at lattice imperfections within the crystal structure of the diamond are sensitive thermoluminescent materials. It has further been found that the lower the nitrogen content the better the thermoluminescent properties of the diamond. This property is clearly illustrated by FIG. 1 where it can be seen that the lower the nitrogen content the better the TL or thermoluminescent response. The nitrogen content for each diamond was measured using standard ESR (electron spin resonance) techniques. Thus, the diamond preferably has a nitrogen content of less than 20 ppm. If of synthetic origin, which is preferred, the diamond may be made by methods known in the art. It has been found that diamond as described above has 50 percent or more of the sensitivity of lithium fluoride which is known as an excellent thermoluminescence material.

The diamond may be produced by taking a diamond having a nitrogen content of less than 100 ppm and subjecting it to nuclear radiation. Nuclear radiation is ionising radiation that has its genesis within the nucleus of the atom. Examples of such radiation are radiation by X-rays, alpha particles, neutrons, protons, electrons and gamma rays. Subjecting the diamond to this radiation causes electrons or holes to be trapped at lattice imperfections within the diamond crystal structure. Heating the diamond then cause at least some of the electrons or holes to be released from their traps, return to stable energy states and emit light. The temperature to which the diamond is subjected to cause it to luminesce will be above ambient and below 500° C. The preferred temperature to which the diamond is subjcted is 200° to 500° C., more preferably 250° to 400° C.

Figure 2:
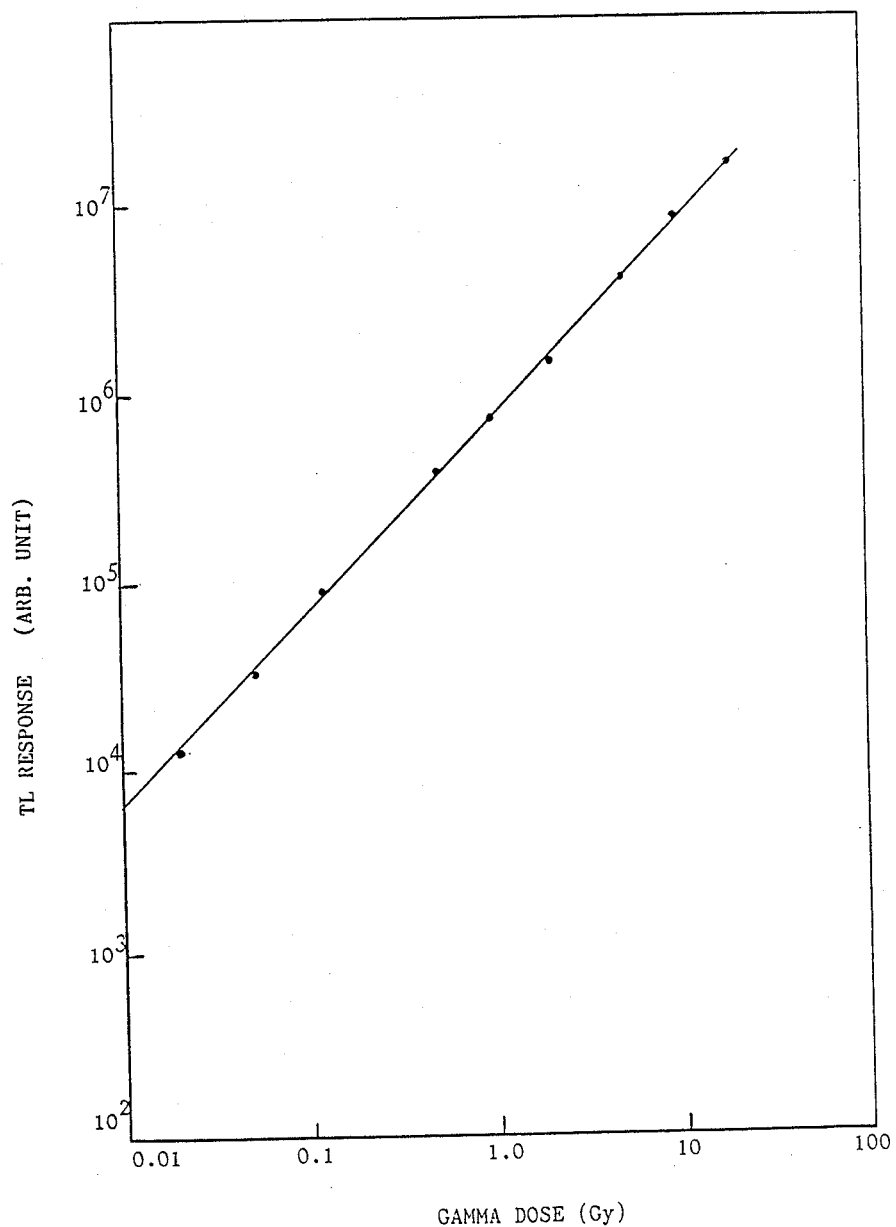
FIG. 2 illustrates the TL response in relation to gamma ray dose applied to a diamond containing approximately 1 ppm nitrogen and approximately 0.2 ppm boron.

It has further been found that if the diamond contains a small quantity of boron then the thermoluminescent linearity improves over a wider range of radiation doses. In other words, with the presence of boron the direct relationship between the radiation dose applied and the thermoluminescence emitted is linear over a wider range of radiation doses. The diamond thus preferably has a boron content in the range 0.1 to 10 ppm. By way of illustration, reference may be made to FIG. 2 which shows the direct relationship between the gamma dose applied to a diamond particle having a nitrogen content of approximately 1 ppm and a boron content of approximatley 0.2 ppm and the TL or thermoluminescent response measured over a range of 0.01 to 100 Gray (Gy). This aspect is particularly important for radiotherapy applications where doses of up to 10 Gy may be monitored.

The invention has particular application to the measurement of nuclear radiation doses. A diamond particle having a nitrogen content not exceeding 100 ppm is subjected to a dose of nuclear radiation. This causes electrons or holes to be trapped at lattice imperfections within the crystal structure of the diamond. When that diamond is heated to a temperature as described above, the diamond luminesces and this luminescence may be used to calculate the dose of radiation to which the diamond was subjected. In practice, the temperature of the diamond will be raised to approximatley 200° C. to anneal out background luminescence. Thereafter the particle is heated linearly up to a temperature of say 400° C. and the luminescence data gathered and integrated. This integrated value is directly proportional to the dose of radiation to which the diamond was subjected. Thus, by providing a suitable calibrated standard it is possible readily to determine the radiation dose in a given circumstance by measuring the luminscent values over a temperature range and integrating those values and comparing the value thus obtained against the calibrated standard.

The invention may be used in radiotheerapy. A diamond particle is small and may be embedded in tissue to be subjected to nuclear radiation. More important, diamond possesses an average atomic number close to that of the tissue to that energy deposited per unit mass to both diamond and tissue over a wide range of incident radiation energies is substantially the same. This equivalence is particularly important at low to medium gamma and X-ray energies. By removing the diamond after radiation and measuring its thermoluminescence it is possible readily to determine the dose of radiation applied to that tissue. The diamond may also be supported in a suitable plate or embedded in a matrix and carried on the clothing of people subjected to regular doses of nuclear radiation. Measurement of the thermoluminescence of the material from time to time provides an immediate and accurate indication of the dose of radiation to which that person has been subjected.

We claim:

1. A material capable of thermoluminescence comprising diamond having a nitrogen content not exceeding 100 ppm, a boron content in an amount from 0.1 to 10 ppm, and electrons or holes tapped at lattice imperfections within the crystal structure of the diamond.

2. A material according to claim 1 wherein the diamond has a nitrogen content of less than 20 ppm.

3. A material according to claim 1 wherein the diamond is synthetic diamond.

4. A method of causing a diamond to luminesce wherein the diamond has a nitrogn content not exceeding 100 ppm and a boron content in an amount from 0.1 to 10 ppm, comprising trapping electrons or holes at lattice imperfections within the crytal structure of the diamond and then subjecting the diamond to a temperature above ambient and below 500° C.

5. A method according to claim 4 wherein the material is subjected to a temperature in the range 200° C. to 500° C.

6. A method according to claim 4 wherein the material is subjected to a temperature in the range 250° to 400° C.

7. A method according to claim 5 wherein the electrons or holes trapped at lattice imperfections within the diamond crystal structure are produced by subjecting diamond having a nitrogen content of less than 100 ppm to nuclear radiation.

8. A method according to claim 8 wherein the nuclear radiation is radiation by X-rays, alpha particles, protons, neutrons, electrons or gamma rays.

9. A device capable of measuring a dose of nuclear radiation comprising a diamond particle having a nitrogen content not exceeding 100 ppm and a boron content in the range of 0.1 to 10 ppm.

10. A device according to claim 10 wherein the diamond has a nitrogen content of less than 20 ppm.

* * * * *